(12) United States Patent
Sip et al.

(10) Patent No.: US 8,047,852 B2
(45) Date of Patent: Nov. 1, 2011

(54) NOTEBOOK COMPUTER HAVING ROTATING ROLLER

(75) Inventors: Kim-Yeung Sip, Shenzhen (CN); Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 85 days.

(21) Appl. No.: 12/577,735

(22) Filed: Oct. 13, 2009

(65) Prior Publication Data

US 2011/0038118 A1 Feb. 17, 2011

(30) Foreign Application Priority Data

Aug. 11, 2009 (CN) .......................... 2009 1 0305504

(51) Int. Cl.
*H01R 39/00* (2006.01)

(52) U.S. Cl. ..................... 439/31; 361/679.28

(58) Field of Classification Search ............. 439/31, 439/165; 361/379.28, 679.28; 200/61.7; 379/433.13; 455/575.3
See application file for complete search history.

(56) References Cited

U.S. PATENT DOCUMENTS

| | | | | |
|---|---|---|---|---|
| 5,027,394 A * | 6/1991 | Ono et al. | | 379/434 |
| 5,237,488 A * | 8/1993 | Moser et al. | | 361/679.28 |
| 5,732,331 A * | 3/1998 | Harms | | 455/575.3 |
| 5,956,398 A * | 9/1999 | Weadon et al. | | 379/433.05 |
| 6,044,473 A * | 3/2000 | Kim | | 713/320 |
| 6,205,331 B1 * | 3/2001 | Jeon | | 455/426.1 |
| 6,295,411 B1 * | 9/2001 | Fastman | | 392/452 |
| 6,295,441 B1 * | 9/2001 | Bjorkengren | | 455/575.3 |
| 6,370,020 B1 * | 4/2002 | Toukairin | | 361/679.22 |
| 6,373,006 B1 * | 4/2002 | Toki | | 200/61.7 |
| 6,434,404 B1 * | 8/2002 | Claxton et al. | | 455/575.3 |
| 6,636,204 B2 * | 10/2003 | Santoh | | 345/179 |
| 6,830,456 B2 * | 12/2004 | Obermeyer | | 439/6 |
| 7,097,479 B2 * | 8/2006 | Lee | | 439/165 |
| 7,163,403 B1 * | 1/2007 | Klotzle et al. | | 439/23 |
| 7,173,813 B2 * | 2/2007 | Wu | | 361/679.08 |
| 7,251,511 B2 * | 7/2007 | Park | | 455/575.3 |
| 7,351,065 B1 * | 4/2008 | Merrell et al. | | 439/31 |
| 7,374,424 B1 * | 5/2008 | Nurmi et al. | | 439/31 |
| 7,637,745 B1 * | 12/2009 | Dai et al. | | 439/28 |
| 7,873,159 B2 * | 1/2011 | Nurmi et al. | | 379/433.13 |

* cited by examiner

*Primary Examiner* — Neil Abrams
(74) *Attorney, Agent, or Firm* — Altis Law Group, Inc.

(57) ABSTRACT

A notebook computer includes a display and a host panel. The display includes a number of first contacts electrically connected to a number of controlling circuits therein for controlling the display to display images. The host panel is pivotably connected to the display. The host panel includes a number of second contacts corresponding to the first contacts and each electrically connected to a triggering circuit of the host panel, for triggering a function of the notebook computer. The first contacts are arranged along a first line and a number of ends of the second contacts on a same side are arranged along a second line. An acute angle is defined between the first line and the second line. When the display is rotated relative to the host panel, the first contacts contact the second contacts in sequence, to trigger multiple functions of the notebook computer.

14 Claims, 7 Drawing Sheets

NOTEBOOK COMPUTER HAVING ROTATING ROLLER

BACKGROUND

1. Technical Field

The present disclosure relates to computers and, particularly, to a notebook computer which is capable of switching functionality when the display is rotated.

2. Description of Related Art

Typically, people generally change a notebook computer into different functionalities, for example, logging off or shutting down, via a mouse or a keyboard. It is not always convenient for people.

Therefore, it is desirable to provide a notebook computer, which can overcome or at least alleviate the above-mentioned problems.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
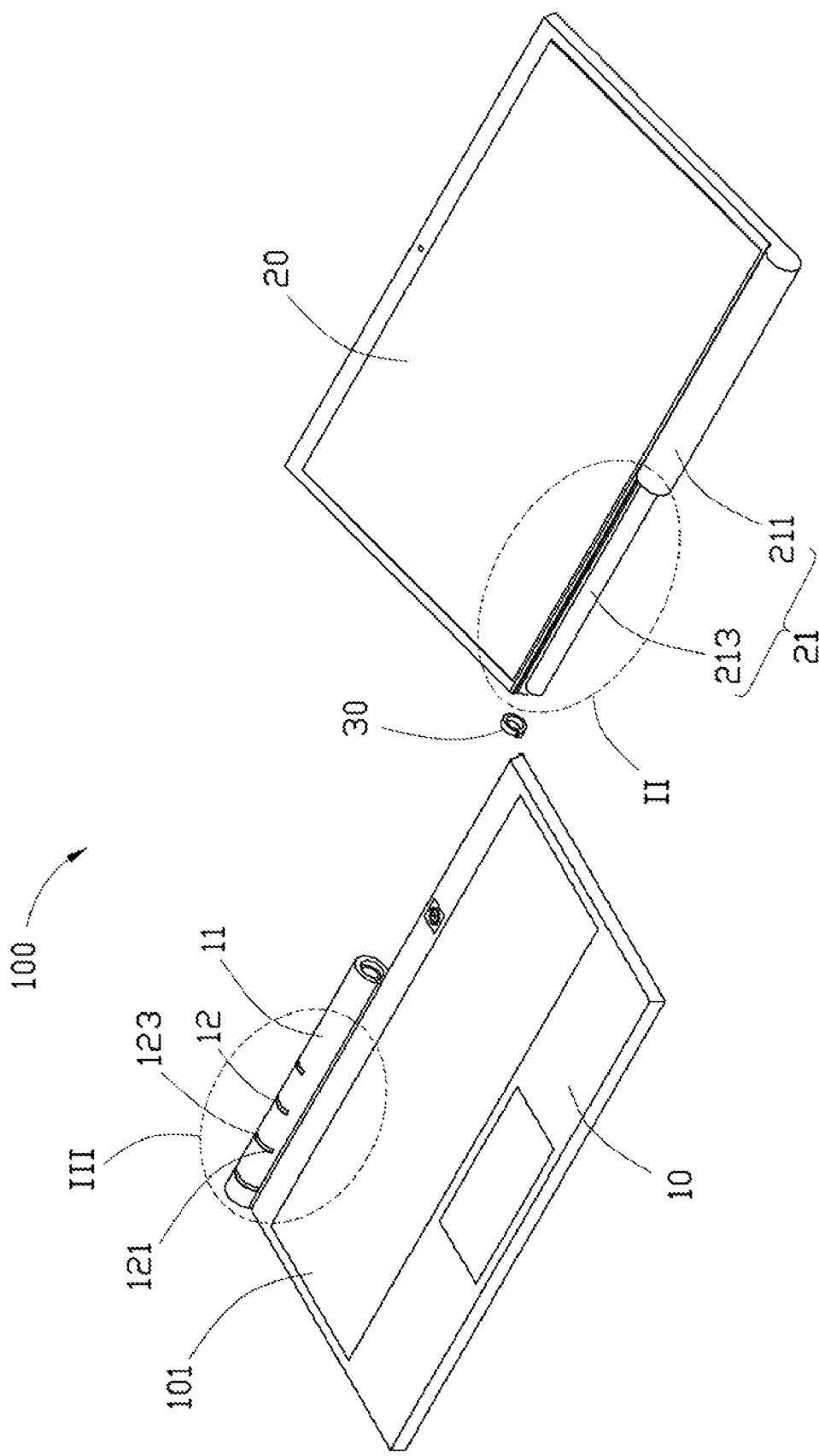
FIG. 1 is an isometric, exploded view of a notebook computer, according to a first embodiment.

Referring to FIG. 1, in accordance with a first embodiment, a notebook computer 100 includes a host panel 10 and a display 20 pivotably connected to the host panel 10.

The display 20 includes a first roller 21 parallel to an edge of the display 20. The first roller 21 includes a first portion 211 and a second portion 213. The first portion 211 is integrally formed on an edge of the display 20. The second portion 213 coaxially extends outward from an end of the first portion 211 and is parallel to the edge of the display 20. Both the first portion 211 and the second portion 213 are configured as columns. The diameter of the second portion 213 is smaller than that of the first portion 211.

The host panel 10 includes a second roller 11 fixed to an edge of the host panel 10 and rotatably connected to the second portion 213 of the first roller 21 and a top surface 101 facing the display 20. The second roller 11 is tube-shaped and the center axis thereof is parallel to the center axis of the second portion 213 of the first roller 21. The outer diameter of the second portion 213 is smaller than the inner diameter of the second roller 11. The axial length of the second roller 11 is substantially equal to that of the second portion 213. A gasket 30 can be inserted into a gap (not shown) defined between the outer surface of the second portion 213 and the inner surface of the second roller 11. In the embodiment, the gasket 30 is made of plastic.

Figure 2:
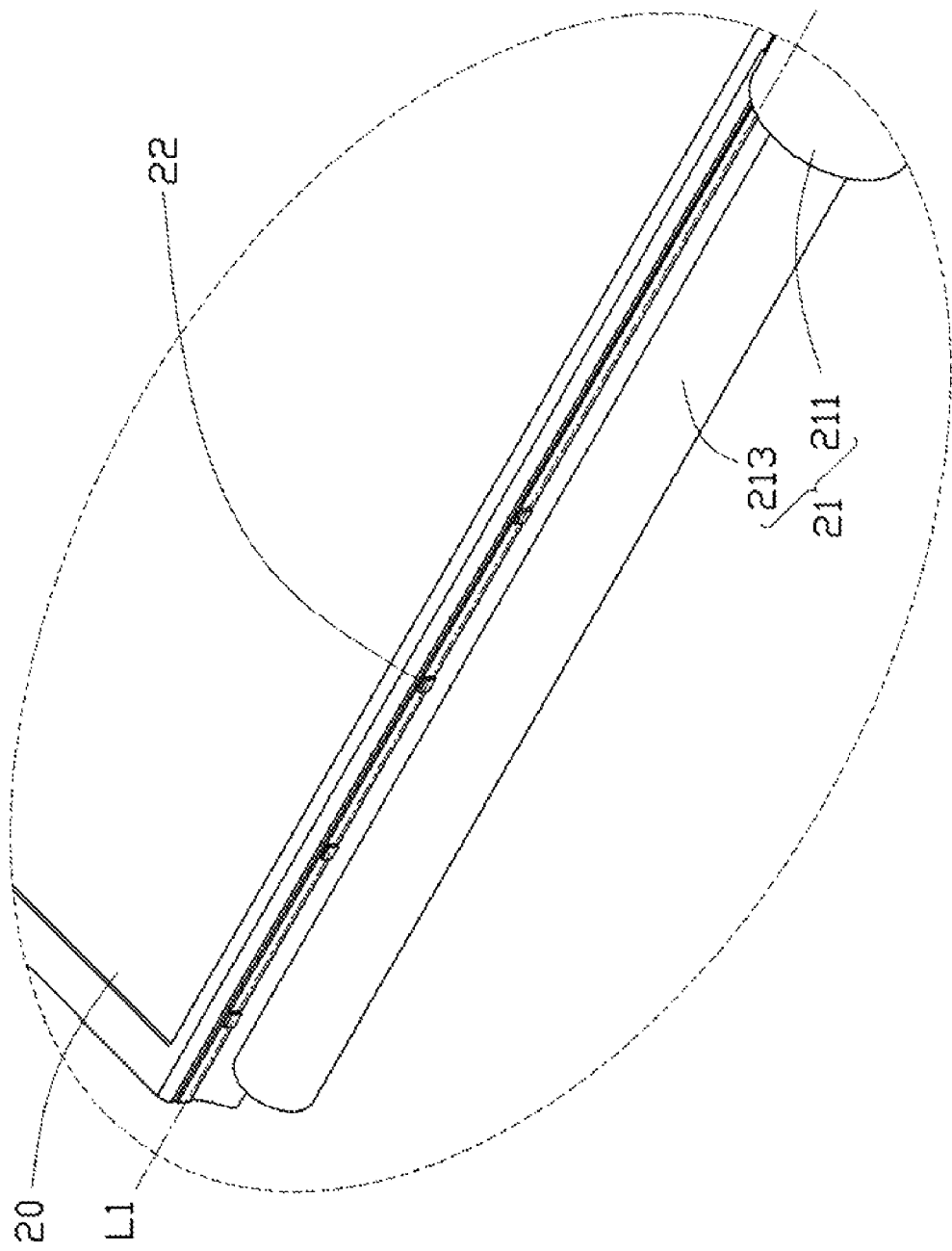
FIG. 2 is an enlarged view of part II of FIG. 1.

Referring to FIG. 2, the display 20 further includes four first contacts 22 disposed on the outer surface of the second portion 213 or on an edge parallel to the first portion 211, arranged along a first line L1. Each first contact 22 is electrically connected to a controlling circuit 221 (see FIG. 4) in the display 20 for controlling the display 20 to display images. In the embodiment, the first contacts 22 are arranged on the edge of the display 20 adjacent to the first portion 211, and the first line L1 is parallel to the center axis of the second portion 213 of the first roller 21.

Figure 3:
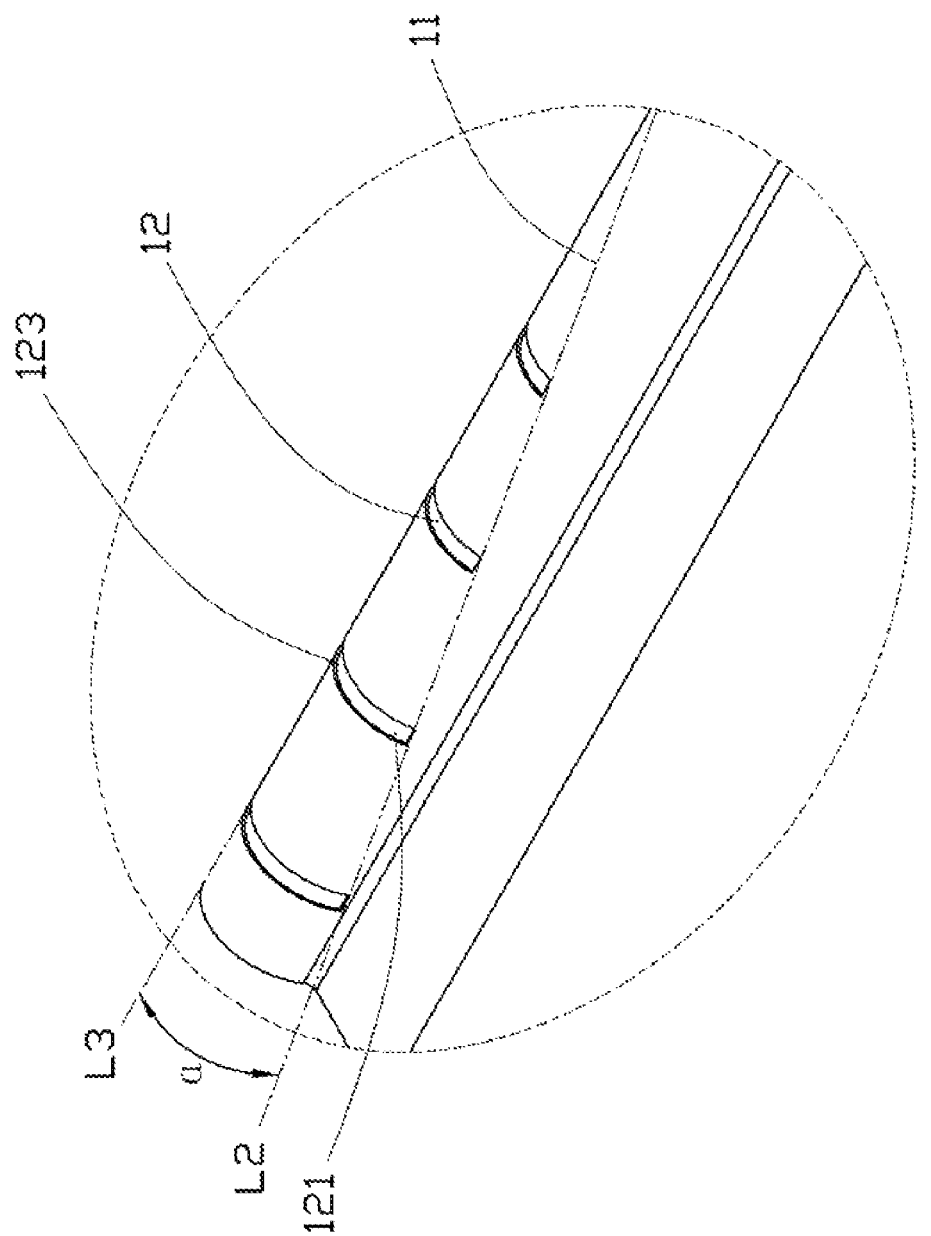
FIG. 3 is an enlarged view of part III of FIG. 1.

Referring to FIG. 3, the second roller 11 includes four second contacts 12 electrically connected to a number of corresponding triggering circuits 13 (see FIG. 4) for triggering different functions of the notebook computer 100, respectively. In the embodiment, both the first contacts 22 and the second contacts 12 are made of metal. The second contacts 12 are arc-shaped and wrapped on the outer surface of the second roller 11 to contact with the first corresponding contacts 22. In the embodiment, the second contacts 12 are arranged along a direction parallel to the center axis of the second roller 11 in sequence, and the length at the outer surface of each second contact 12 decreases along the arranged direction.

Each second contact 12 includes a first end 121 adjacent to the top surface 101 and a second end 123 away from the first end 121. The first ends 121 of the second contacts 12 are arranged on a second line L2. The second ends 123 of the second contacts 12 are arranged on a third line L3 parallel to the center axis of the second roller 11. An acute angle α is formed between the second line L2 and the center axis of the second roller 11. When the display 20 is rotated relative to the host panel 10, each of the first contacts 22 contacts with the corresponding second contact 12 in sequence, thereby generating a triggering signal to trigger a function of the notebook computer 100.

Figure 4:
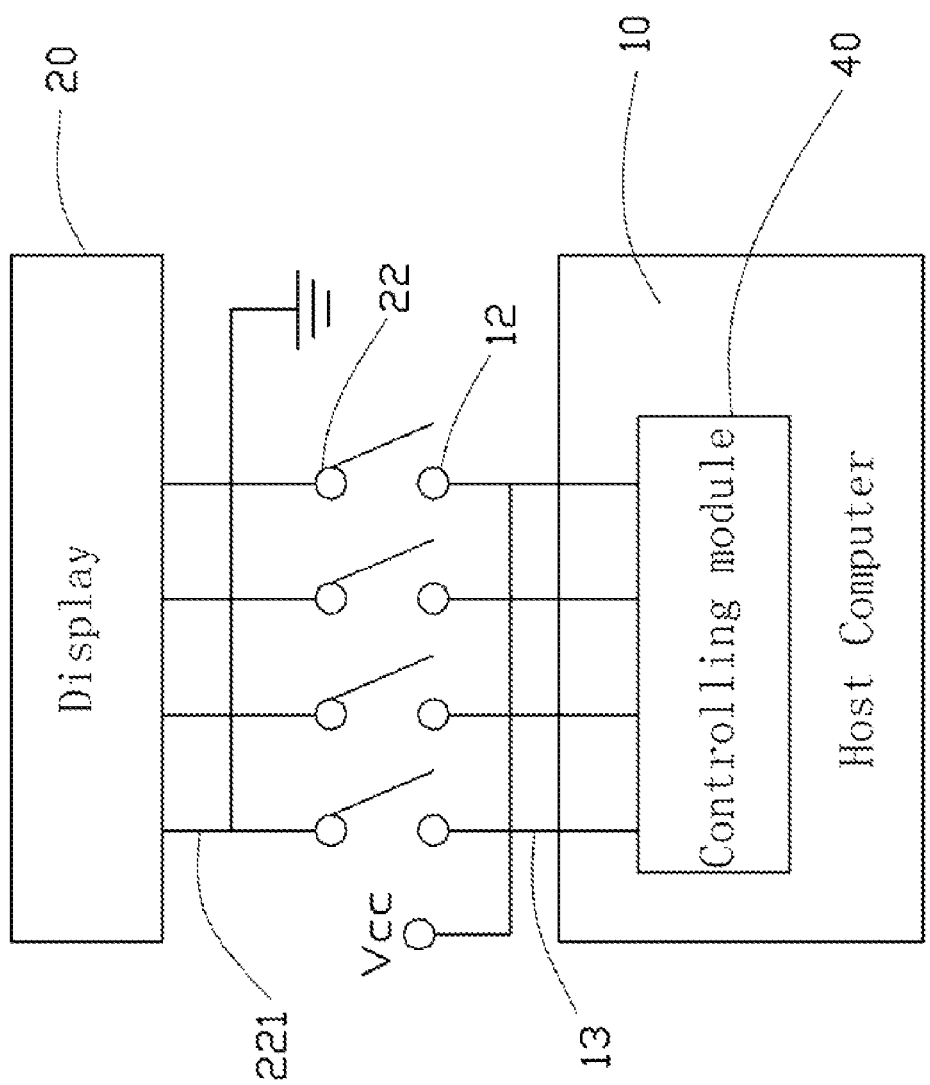
FIG. 4 is a functional block diagram of the notebook computer of FIG. 1.

Referring to FIG. 4, the host panel 10 further includes a controlling module 40 connecting the triggering circuits to a number of function modules (not shown) of the notebook computer 100 for changing to different functions of the notebook computer 100, according to the triggering signals.

When the display 20 is rotated relative to the host panel 10 from 0° where the display 20 is contacted with the top surface 101 of the host panel 10, to an angle larger than 90°, the controlling module 40 achieves a first signal, a second signal, a third signal and a fourth signal in sequence. In the embodiment, the first signal is triggered by contacting one of the first contacts 22 with one corresponding second contact 12. The second signal is triggered by contacting two of the first contacts 22 with the corresponding two second contacts 12. The third signal is triggered by contacting three of the first contacts 22 with the corresponding three second contacts 12. The fourth signal is triggered by contacting all of the first contacts 22 and all of the second contacts 12. The first signal, the second signal, the third signal, and the fourth signal can trigger the corresponding function modules of the notebook computer 100 in sequence, thereby the notebook computer 100 can perform different functions by rotation of the display 20 relative to the host panel 10.

Figure 5:
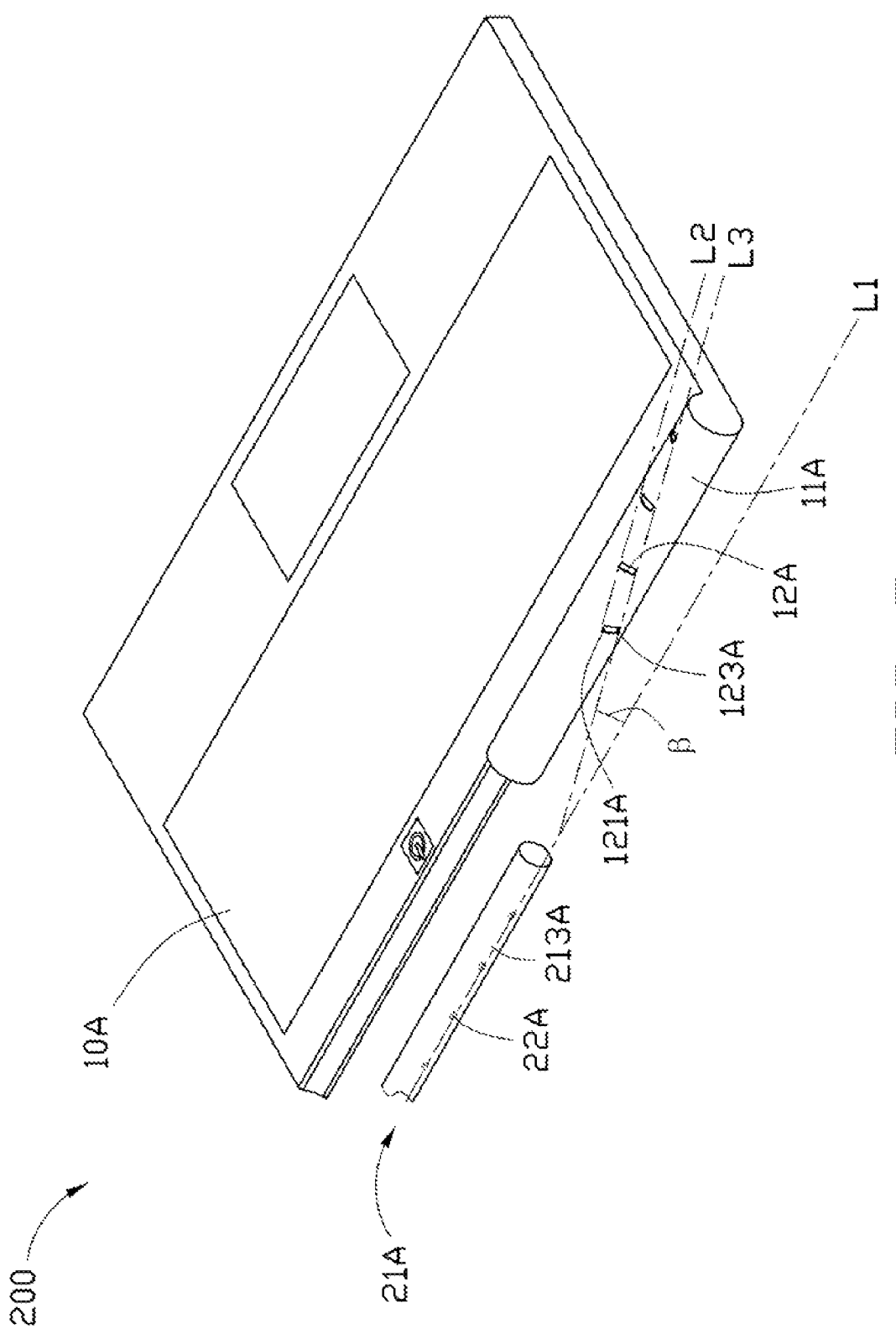
FIG. 5 is an isometric, partially exploded view of a notebook computer, according to a second embodiment.

Referring to FIG. 5, a notebook computer 200, according to a second embodiment, is shown. The configuration of the notebook computer 200 of the second embodiment is similar to that of the notebook computer 100 of the first embodiment. In the second embodiment, the first contacts 22A are disposed on the first roller 21A, and all of the second contacts 12A have a same length.

In the second embodiment, four first contacts 22A disposed on the outer surface of a second portion 213A, arranged along a first line L1. The first line L1 is parallel to the center axis of the second portion 213A of the first roller 21A, so that a rotating angle of the first contacts 22A is equal to that of the display (shown in FIG. 1). The first ends 121A of the second contacts 12A are arranged along a second line L2. The second ends 123A of the second contacts 12A are arranged along a third line L3 substantially parallel to the second line L2. An acute angle β is formed between one of the two parallel lines (the second line L2 and the third line L3) and the first line L1. Additionally, a line connecting two adjacent second ends 123A of the second contacts 12A is parallel to the center axis of the second portion 213A of the first roller 21A. When the display (shown in FIG. 1) is rotated relative to the host panel 10A, the first contacts 22A contact with the second contacts 12A one by one, thereby triggering different functions of the notebook computer 200.

Understandably, in other alternative embodiments, the notebook computer 200 can trigger multiple functions therein at the same time, while the display 20A is rotated relative to the host panel 10A.

Figure 6:
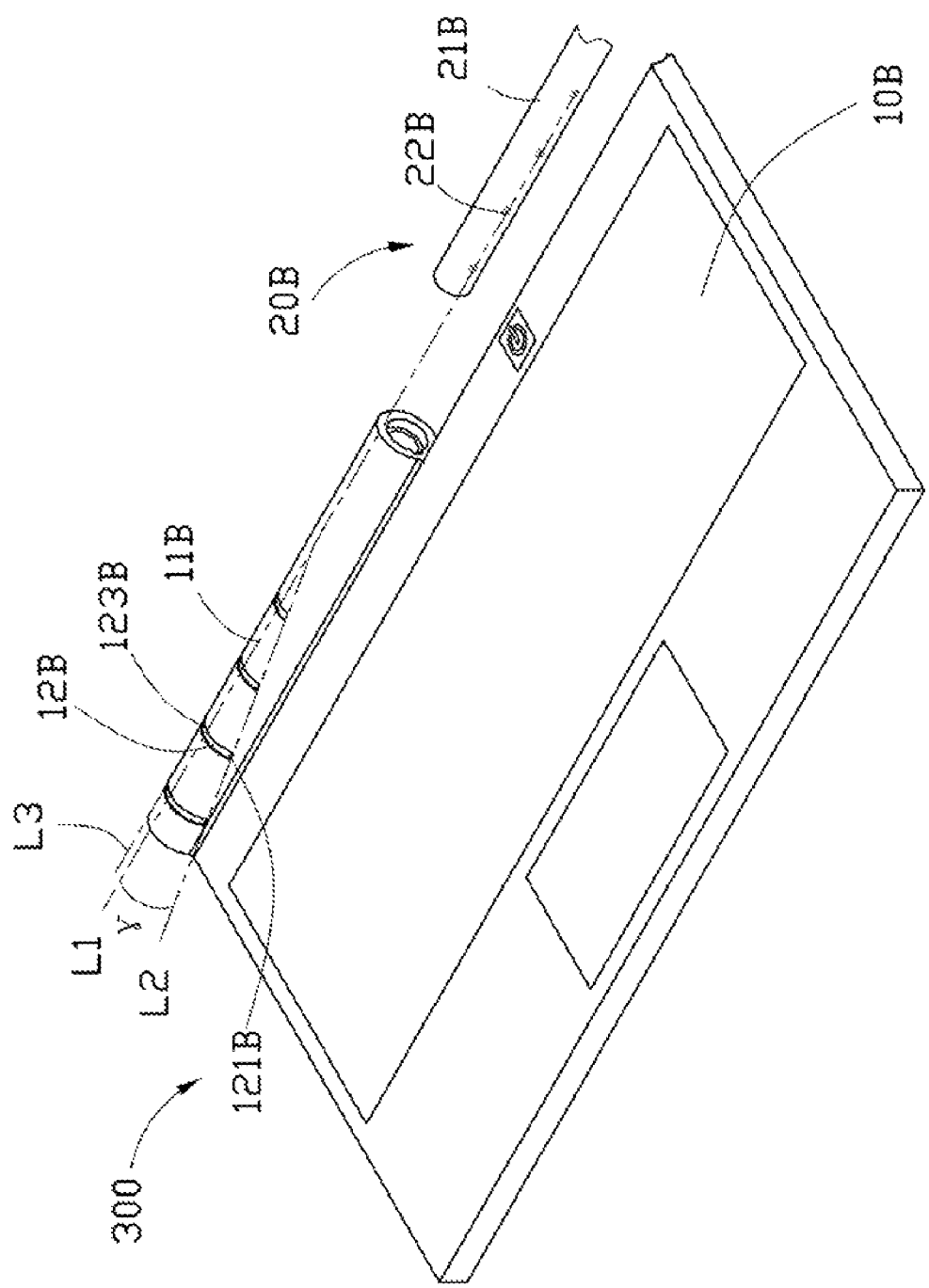
FIG. 6 is an isometric, partially exploded view of a notebook computer, according to a third embodiment.

Referring to FIG. 6, a notebook computer 300, in accordance with a third embodiment, is shown. The configuration of the notebook computer 300 of the third embodiment is similar to that of the notebook computer 200 of the second embodiment. In the third embodiment, the lengths of the second contacts 12B are different, just as the configuration in the first embodiment. First contacts 22B disposed on the outer surface of a first roller 21B, arranged along a first line L1. The first line L1 is parallel to the center axis of the first roller 21B, so that a rotating angle of the first contacts 22B is equal to that of the display. The first ends 121B of the second contacts 12B are arranged along a second line L2. The second ends 123B of the second contacts 12B are arranged along a third line L3 substantially parallel to the first line L1. An acute angle γ is formed between the second line L2 and the center axis of the second roller 11B. Both of the first line L1 and the third line L3 are also parallel to the center axis of the second roller 11B in this embodiment. When the display 20B is rotated relative to the host panel 10B, the first contacts 22B contact the second contacts 12B in sequence.

Figure 7:
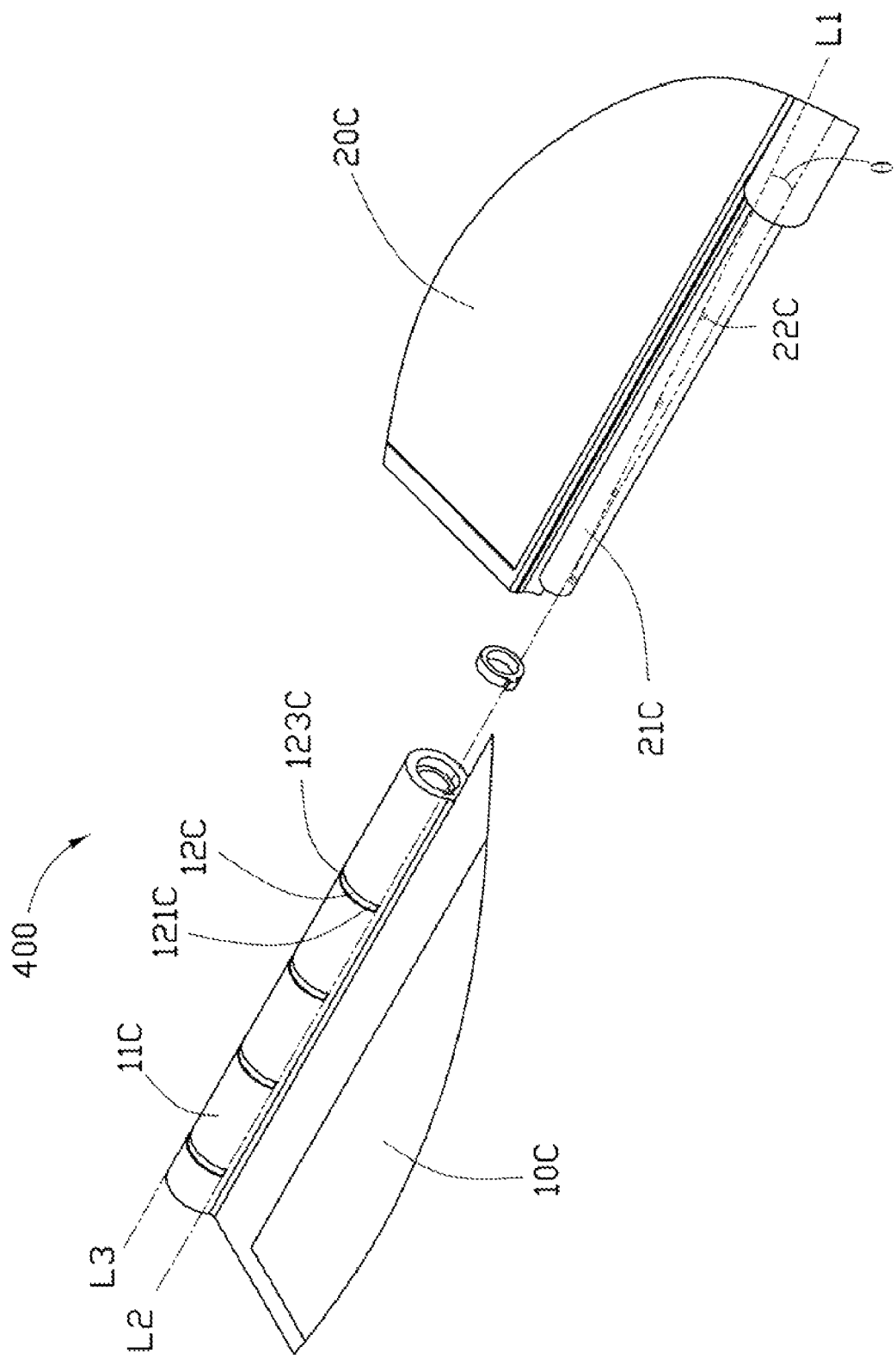
FIG. 7 is an isometric, partially exploded view of a notebook computer, according to a fourth embodiment.

Referring to FIG. 7, a notebook computer 400, in accordance with a fourth embodiment, is shown. The configuration of the notebook computer 400 of the fourth embodiment is similar to that of the notebook computer 300 of the third embodiment. In the fourth embodiment, First contacts 22C disposed on the outer surface of a first roller 21C, arranged along a first line L1. The first ends 121C of the second contacts 12C are arranged along a second line L2. The second ends 123C of the second contacts 12C are arranged along a third line L3 substantially parallel to the second line L2. An acute angle θ is formed between the first line L1 and the center axis of the second portion 213C of the first roller 21C, and all of the second contacts 12C have a same length. Both of the second line L2 and the third line L3 are parallel to the center axis of the second portion 213C of the first roller 21C. When the display 20C is rotated relative to the host panel 10C, the first contacts 22C contact the second contacts 12C one by one, thereby triggering different functions of the notebook computer 400.

It should be understood that the arrangements of the first contacts and the second contacts are not limited to the above embodiments. For example, the first line L1 and the third line L3 are parallel to the center axis of the first roller, but the second line L2 is parallel to the center axis of the first roller. As far as the controlling module 40 can achieve different signals while the first contacts contact with the corresponding second contacts, thereby the notebook computer can implement different functions.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A notebook computer, comprising:
   a display comprising a plurality of first contacts electrically connected to a plurality of controlling circuits therein for controlling the display to display images; and
   a host panel pivotably connected to the display by a second roller fixed to and oriented along an edge of the host panel, the host panel comprising:
   a plurality of second contacts fixed on the second roller corresponding to the first contacts, each of the second contacts electrically connected to a triggering circuit of the host panel for triggering a function of the notebook computer;
   wherein, the first contacts are arranged along a first line, a plurality of ends of the second contacts on a same side are arranged along a second line, and an acute angle is formed between the first line and the second line, the first contacts contact with the corresponding second contacts in sequence, to trigger different functions of the notebook computer, when the display is rotated relative to the host panel.

2. The notebook computer in claim 1, wherein the first contacts are disposed on an edge of the display towards the host panel, the second contacts are wrapped on the outer surface of the second roller, to contact with the first contacts correspondingly.

3. The notebook computer in claim 1, wherein the display comprises a first roller parallel to an edge of the display, and the first contacts are disposed on the outer surface of the first roller.

4. The notebook computer in claim 3, wherein the first roller comprises a first portion integrally formed on an edge of the display, and a second portion coaxially extending outward from an end of the first portion and parallel to the edge of the display, the diameter of the second portion is smaller than that of the first portion.

5. The notebook computer in claim 1, wherein the second roller is rotatably connected to the second portion of the first roller and a top surface facing the display.

6. The notebook computer in claim 5, wherein the second roller is tube-shaped, the outer diameter of the second portion is smaller than the inner diameter of the second roller, and the axial length of the second roller is substantially equal to that of the second portion.

7. The notebook computer in claim 6, wherein a gasket is inserted between the second portion and the second roller.

8. The notebook computer in claim 5, wherein each second contact comprises a first end adjacent to the top surface of the host panel and a second end away from the first end, and each second contact is arc-shaped.

9. The notebook computer in claim 8, wherein the second line is formed by connecting the first ends of the second contacts, the first line is parallel to the center axis of the first roller, a third line is formed by connecting the second ends of the second contacts in sequence, and the second line is not parallel to the center axis of the first roller, the third line is parallel to the center axis of the first roller.

10. The notebook computer in claim 8, wherein the second line is formed by connecting the first ends of the second contacts, the first line is parallel to the center axis of the first roller, a third line is formed by connecting the second ends of the second contacts in sequence and parallel to the second line, and both the second line and the third line are not parallel to the center axis of the first roller.

11. The notebook computer in claim 8, wherein the second line is formed by connecting the first ends of the second contacts, the first line is not parallel to the center axis of the first roller, a third line is formed by connecting the second ends of the second contacts in sequence, and the second line is parallel to the center axis of the first roller, the third line is not parallel to the center axis of the first roller.

12. The notebook computer in claim 8, wherein the second line is formed by connecting the first ends of the second contacts, the first line is not parallel to the center axis of the first roller, a third line is formed by connecting the second ends of the second contacts in sequence, and both the second line and the third line are parallel to the center axis of the first roller.

13. The notebook computer in claim 1, wherein both of the first contacts and the second contacts are made of metal.

14. The notebook computer in claim 1, further comprising a controlling module configured for changing the notebook computer into different functions, according to a plurality of triggering signals from the second contacts.

* * * * *